(12) United States Patent
Dutcher et al.

(10) Patent No.: US 7,534,106 B1
(45) Date of Patent: May 19, 2009

(54) KINESTHETIC NUMBER LINE

(76) Inventors: David S. Dutcher, 9262 Santenay Way, Sacramento, CA (US) 95829; Jennifer B. Dutcher, 9262 Santenay Way, Sacramento, CA (US) 95829

( * ) Notice: Subject to any disclaimer, the term of this patent is extended or adjusted under 35 U.S.C. 154(b) by 537 days.

(21) Appl. No.: 11/261,370

(22) Filed: Oct. 28, 2005

(51) Int. Cl.
*G09B 19/02* (2006.01)

(52) U.S. Cl. ..................................... 434/188

(58) Field of Classification Search ............... 434/188, 434/190, 191, 200, 202, 159, 168, 258, 175
See application file for complete search history.

(56) References Cited

U.S. PATENT DOCUMENTS

| | | | | |
|---|---|---|---|---|
| 448,019 | A * | 3/1891 | Garben | 434/209 |
| 1,168,274 | A * | 1/1916 | Baumann | 434/175 |
| 2,800,728 | A * | 7/1957 | Bergman | 434/191 |
| 2,875,529 | A * | 3/1959 | Cornelius | 434/208 |
| 3,206,873 | A * | 9/1965 | Duus et al. | 434/175 |
| 3,353,284 | A * | 11/1967 | Hursh et al. | 434/190 |
| 3,419,972 | A * | 1/1969 | Kitzinger | 434/203 |
| 4,257,174 | A * | 3/1981 | Presley | 434/188 |
| 4,434,982 | A * | 3/1984 | Bearint | 273/153 S |
| 4,474,558 | A * | 10/1984 | Quercetti | 434/189 |
| 6,884,077 | B2 * | 4/2005 | Faulkner | 434/188 |
| 7,275,934 | B2 * | 10/2007 | Smyth | 424/189 |

* cited by examiner

*Primary Examiner*—Kurt Fernstrom
(74) *Attorney, Agent, or Firm*—Dennis W. Beech

(57) ABSTRACT

The kinesthetic number line may be used for teaching numerical counting. A flat panel may have a number line image on an upper surface thereof. A longitudinal track may be disposed adjacent a longitudinal portion of said number line image. A plurality of orthogonal tracks may be in communication with the longitudinal track wherein each of the orthogonal tracks may terminate at a second end adjacent to one of a set of sequential numbers in the number line image. A ball may be movable in the longitudinal track and in the plurality of orthogonal tracks.

11 Claims, 1 Drawing Sheet

U.S. Patent      May 19, 2009      US 7,534,106 B1
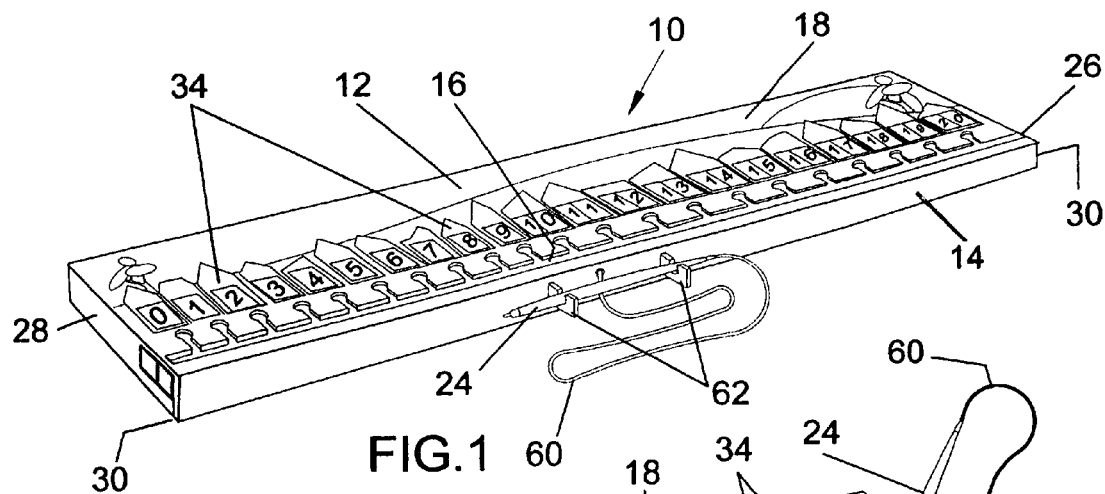
FIG. 1
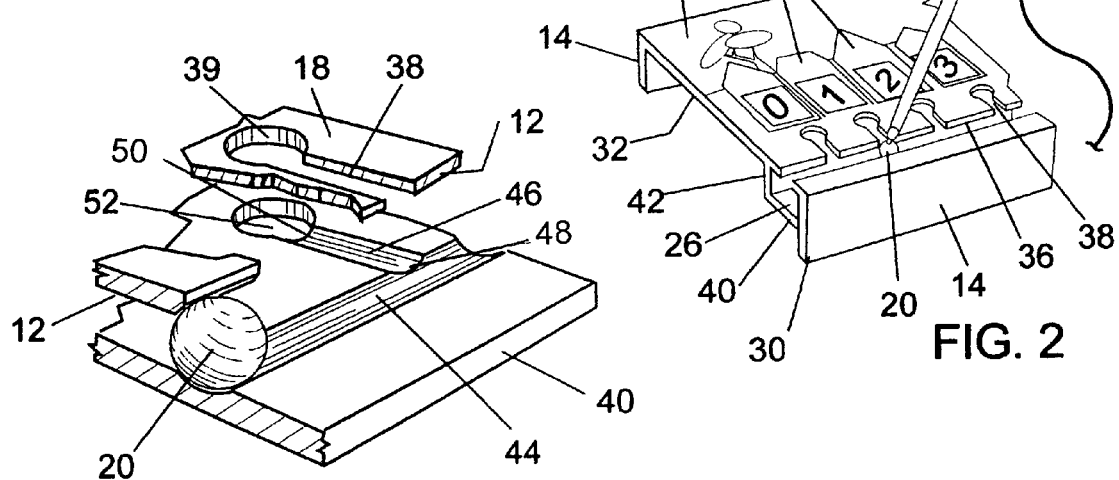
FIG. 2
FIG. 3
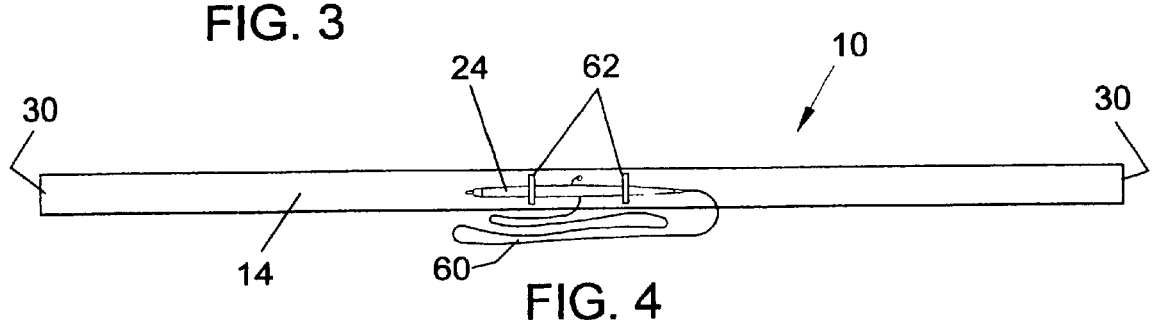
FIG. 4

KINESTHETIC NUMBER LINE

BACKGROUND OF THE INVENTION

This invention relates to devices such as number lines used to teach children mathematics in the primary grades in school. The new device combines a number line with a track containing one or more balls to be moved from one number line location to another as may be instructed by a teacher.

Number lines that may have number sequences, as for example, in primary school grades number sequences from 0 to 20 or 25 and in upper school grades number sequences from negative 20 to 100, may have been used for many years to teach children one to one correspondence between verbal counting or reciting of numbers and what they are actually counting. Children may be able to recite numbers from 0 to 20 and yet not relate this count to physical numbers. A number line printed on paper, cardboard or other material may be used to instruct a child to point to each number as they may recite the number. However, most young children may not understand that each number represents a single count. The children may often end up with a physical count significantly different from the verbal count. A number line combined with a device that may require more concentration and use of muscles and tendons to move from one number to another during counting may improve learning of the one to one correspondence between numbers and counting. This may be a more physical or kinesthetic learning experience.

SUMMARY OF THE INVENTION

The present invention is directed to devices for teaching numerical counting. A flat panel may have a number line image on an upper surface thereof. A longitudinal track may be disposed adjacent a longitudinal portion of said number line image. A plurality of orthogonal tracks may be in communication with the longitudinal track wherein each of the orthogonal tracks may terminate at a second end adjacent to one of a set of sequential numbers in the number line image. A ball may be movable in the longitudinal track and in the plurality of orthogonal tracks.

These and other features, aspects and advantages of the present invention will become better understood with reference to the following drawings, description and claims.

BRIEF DESCRIPTION OF THE DRAWINGS

FIG. 1 illustrates a perspective view of the number line device according to an embodiment of the invention;

FIG. 2 illustrates a partial perspective view of the number line device with magnetic rod according to an embodiment of the invention;

FIG. 3 illustrates a partial fragmented cross sectional view of the number line device according to an embodiment of the invention;

FIG. 4 illustrates a front elevation view of the number line device according to an embodiment of the invention.

DETAILED DESCRIPTION

The following detailed description represents the best currently contemplated modes for carrying out the invention. The description is not to be taken in a limiting sense, but is made merely for the purpose of illustrating the general principles of the invention.

Referring to FIGS. 1 through 4, a number line device 10 may have a generally flat panel 12 with side walls 14, a track 16 generally positioned below the upper surface 18 of the flat panel 12, and one or more balls 20 movable and positionable in the track 16. There may be a magnetic rod 24 for use in moving a metal ball 20 in the track 16. The balls 20 may be removed from the track 16 at track ends 26 or an end wall 28 may be attached at each device end 30 to retain the balls 20 in the track 16. The end wall 28 may have a closable cover 54 for removal and insertion of balls 20 in track 16. The upper surface 18 may have a number line image 34 printed or otherwise inscribed thereon.

The track 16 may be formed by a generally linear base wall 40 attached to a side wall 14 and a generally vertical support wall 42 attached to the lower surface 32 of the flat panel 12. The base wall 40 may have a longitudinal groove 44 formed therein that may be disposed below a longitudinal slot 36 formed in the flat panel 12. There may be relatively short orthogonal grooves 46 formed in the base wall 40 with a first groove end 48 in communication with the longitudinal groove 44 and a second groove end 50 having a groove aperture 52. The orthogonal grooves 46 may be disposed below orthogonal slots 38 formed in the flat panel 12.

This structure may form a track 16 wherein a ball 20 may be moved longitudinally adjacent the number line image 34 and the ball 20 may be moved laterally in an orthogonal groove 46 to a position adjacent a specific number in the number line image 34. The orthogonal slot 38 may have a partially circular portion 39 formed adjacent to the number line image 34. The magnetic rod 24 may be used to move the ball 20 in the track to the various numbers on the number line image 34. There may be a tether 60 to retain the magnetic rod 24 to the side walls 14 and there may be a holder 62 in which the magnetic rod 24 may be placed.

There may be more than one ball 20 used in the track 16. For example, two balls 20 may be used wherein one or both balls may be colored to differentiate between the balls 20. One ball 20 may be used for sequential counting along the number line image 34 and a second ball 20 may be used as a place holder for calculating missing addends. The orthogonal grooves 46 may be inclined slightly downward from the longitudinal groove elevation to aid a user in moving a ball 20 into a groove aperture 52. The longitudinal slot 36 and orthogonal slots 38 may be sufficiently narrow to inhibit removal of a ball 20 through the slots 36, 38. This may prevent the balls 20 from falling out of the track 16. The groove aperture 52 may have a sufficient diameter to allow a ball 20 to descend partially into a groove aperture 52 relative to the height of an orthogonal groove 46 and yet not fall through the groove aperture 52.

The number line image 34 may be designed as a row of houses with each house having one of the sequential numbers from 0 to 20 as an example. The orthogonal slots 38 may be viewed as driveways or cul-de-sacs into which a student may be moving the ball 20.

While the invention has been particularly shown and described with respect to the illustrated embodiments thereof, it will be understood by those skilled in the art that the foregoing and other changes in form and details may be made therein without departing from the spirit and scope of the invention.

We claim:

1. A device for teaching numerical counting comprising:
 a flat panel having a number line image on an upper surface thereof;
 a longitudinal track disposed adjacent to a longitudinal portion of said number line image;
 a plurality of orthogonal tracks in communication with said longitudinal track wherein each of said orthogonal tracks terminate at a second end adjacent to one of a set of sequential numbers in said number line image; and a ball formed of metal and a magnetic rod operable to move said ball in said longitudinal track and said plurality of orthogonal tracks.

2. The device as in claim 1 wherein said flat panel having two subtending side walls attached.

3. The device as in claim 2 wherein there is an end wall attached at a first device end and a second device end.

4. The device as in claim 3 wherein one of said end walls having a closable cover disposed at a track end.

5. The device as in claim 1 wherein said magnetic rod is attached to said device with a tether.

6. The device as in claim 2 wherein a holder for said magnetic rod is attached to one of said side walls.

7. The device as in claim 1 wherein said longitudinal track and said plurality of orthogonal tracks comprising;

a base wall with an upstanding support wall wherein said base wall attached to a side wall attached to said flat panel and said upstanding support wall attached to a lower surface of said flat panel;

a longitudinal groove formed in said base wall and disposed below said flat panel having a longitudinal slot formed therein;

a plurality of orthogonal grooves formed in said base wall wherein a groove first end is in communication with said longitudinal groove and a second groove end having a groove aperture therein; and said plurality of orthogonal grooves disposed below said flat panel having a plurality of orthogonal slots formed therein.

8. The device as in claim 7 wherein said longitudinal slot and said plurality of orthogonal slots having a width smaller than the diameter of said ball.

9. The device as in claim 7 wherein said plurality of orthogonal grooves are inclined downwardly from said first groove end to said second groove end.

10. The device as in claim 7 wherein said groove aperture having a diameter to allow said ball to move downwardly when in said groove aperture without passing through said groove aperture.

11. The device as in claim 1 wherein there is a first ball distinguishable from a second ball and said first ball and said second ball movable in said longitudinal track and said plurality of orthogonal tracks.

* * * * *